United States Patent
Thomas

(10) Patent No.: US 9,909,740 B2
(45) Date of Patent: Mar. 6, 2018

(54) OVERMOLDED LEDS AND FABRIC IN VIRTUAL REALITY HEADSETS

(71) Applicant: Oculus VR, LLC, Menlo Park, CA (US)

(72) Inventor: Matt Lee Thomas, Buena Park, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/359,558

(22) Filed: Nov. 22, 2016

(65) Prior Publication Data
US 2017/0074494 A1    Mar. 16, 2017

Related U.S. Application Data

(63) Continuation of application No. 14/587,576, filed on Dec. 31, 2014, now Pat. No. 9,535,254.

(51) Int. Cl.
| | |
|---|---|
| *F21V 19/00* | (2006.01) |
| *G06F 3/01* | (2006.01) |
| *H04N 5/33* | (2006.01) |
| *F21V 9/08* | (2006.01) |
| *F21V 19/02* | (2006.01) |
| *G02B 27/01* | (2006.01) |
| *G06T 19/00* | (2011.01) |
| *B29C 45/00* | (2006.01) |
| *G02B 27/00* | (2006.01) |
| *F21V 9/04* | (2018.01) |
| *B29C 39/10* | (2006.01) |
| *F21Y 115/10* | (2016.01) |
| *F21Y 107/50* | (2016.01) |

(52) U.S. Cl.
CPC .......... *F21V 19/002* (2013.01); *B29C 39/10* (2013.01); *B29C 45/00* (2013.01); *F21V 9/04* (2013.01); *F21V 19/02* (2013.01); *G02B 27/0093* (2013.01); *G02B 27/0176* (2013.01); *G06F 3/012* (2013.01); *G06T 19/006* (2013.01); *H04N 5/332* (2013.01); *F21Y 2107/50* (2016.08); *F21Y 2115/10* (2016.08); *G02B 2027/0178* (2013.01)

(58) Field of Classification Search
CPC .. F21V 19/002; G02B 27/0176; G06T 19/006
See application file for complete search history.

(56) References Cited

U.S. PATENT DOCUMENTS

| | | | |
|---|---|---|---|
| 9,176,325 B2 | 11/2015 | Lyons | |
| 9,274,340 B2 | 3/2016 | Lyons | |
| 9,377,626 B2 | 6/2016 | Lyons | |
| 9,535,254 B2 * | 1/2017 | Thomas | ............. G02B 27/0176 |

* cited by examiner

*Primary Examiner* — Seahvosh Nikmanesh
(74) *Attorney, Agent, or Firm* — Fenwick & West LLP

(57) ABSTRACT

A headset for virtual reality applications includes an array of light emitting diodes (LEDs) emitting light captured by a camera included in a virtual reality system, allowing the virtual reality system to detect the position and orientation of the headset in three-dimensional space. To manufacture the headset, a flexible strip including a circuit having the LEDs is molded into an outer shell of the headset using a casting material that is transmissible to wavelengths of light transmitted by the LEDs. An interior surface of the outer shell of the headset is within a specified distance of the LEDs. The outer shell may also include fabric that is also molded into the outer shell in the same or in a similar process.

23 Claims, 3 Drawing Sheets

OVERMOLDED LEDS AND FABRIC IN VIRTUAL REALITY HEADSETS

CROSS REFERENCE TO RELATED APPLICATIONS

This application is a continuation of U.S. application Ser. No. 14/587,576 filed on Dec. 31, 2014, which is hereby incorporated by reference in its entirety.

BACKGROUND

This disclosure relates generally to manufacturing processes, and more specifically to overmolding a light emitting diode (LED) array into a casting material.

Virtual reality systems rely on accurately tracking users to provide realistic content to the users. Many virtual reality systems track users by mounting light emitting diodes (LEDs) onto a headset worn by a user that presents virtual reality content to a user so a camera included in the virtual reality system may detect the position and orientation of the headset in three-dimensional space based on the light signals transmitted by the LEDs and captured by the camera. Current manufacturing techniques manually place a flexible array of LEDs onto a headset and affix the flexible array of LEDs to the headset with glue. However, manually affixing and adhering flexible arrays of LEDs to headsets result in high labor costs, greater variation in positioning of the LEDs on the headsets, and additional material between the flexible array of LEDs and the surface of the headset. Greater variation in the positions of LEDs on the headset may impair calibration of the virtual reality system to a position of the headset, which impairs subsequent tracking of the headset by the virtual reality system. Errors in tracking the headset may reduce the accuracy or quality of content provided via the headset by the virtual reality system.

Additionally, some headsets may have fabric attached to an outer surface of the headsets. Conventional manufacturing processes wrap the fabric around the headset after the headset has been molded. However, this is labor-intensive and imprecise, resulting in low yields and increased risk of deformation from creep.

SUMMARY

A headset for virtual reality applications includes an array of light emitting diodes (LEDs) emitting light captured by a camera included in a virtual reality system, allowing the virtual reality system to detect the position and orientation of the headset in three-dimensional space. To manufacture the headset, a flexible strip including a circuit having the LEDs is molded into an outer shell of the headset using a casting material (e.g., resin) that is transmissible to wavelengths of light transmitted by the LEDs. When manufacturing the headset, a flexible array of LEDs is attached to a surface of a molding structure and a mold is assembled by positioning an additional molding structure proximate to the molding structure. A surface of the additional molding structure is within a specified distance of the flexible array of LEDs so the LEDs are within the specified distance of an interior surface of the outer shell of the headset. The casting material is inserted into the assembled mold to form the headset. The outer shell may also include fabric that is also molded into the outer shell in the same or in a similar process. Molding the LEDs into the outer shell improves manufacturing tolerance and reduces labor in the manufacturing process.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An outer shell of a virtual reality headset may include light emitting diodes (LEDs) embedded in a casting material to aid in calibration. This outer shell may be made through, which is a method of co-molding where an object is molded into a single side of a casting material. In addition to using less casting material, which results in a lighter outer shell, using overmolding to create the outer shell of the virtual reality headset also reduces labor costs and allows more precise placement or LEDs in the outer shell of the headset.

Example Outer Shell

Figure 1A:
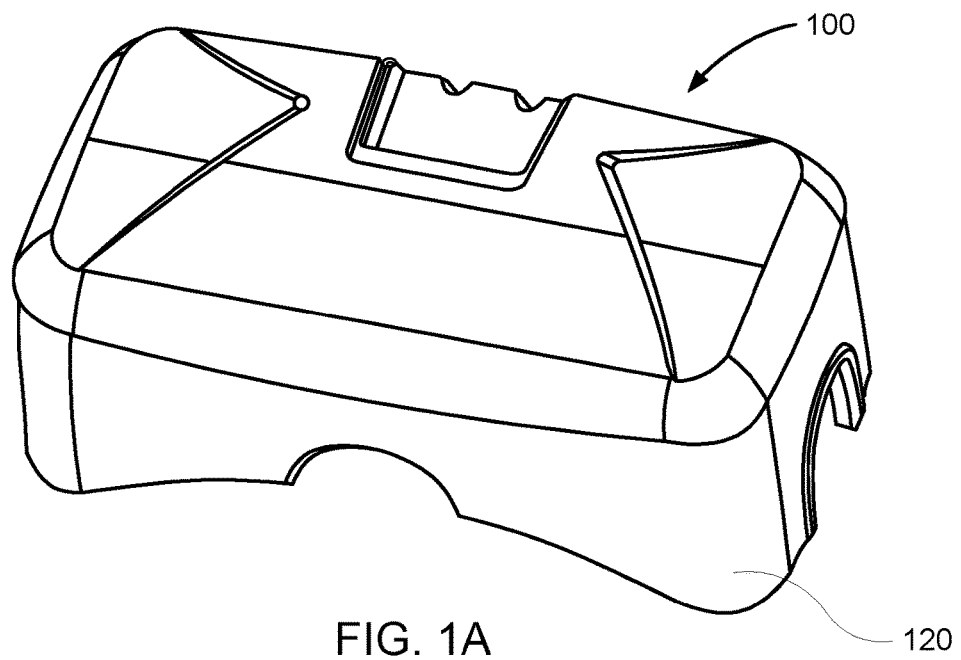
FIG. 1A is an isometric view of an outside of an outer shell of a virtual reality headset, according to one embodiment.
Figure 1B:
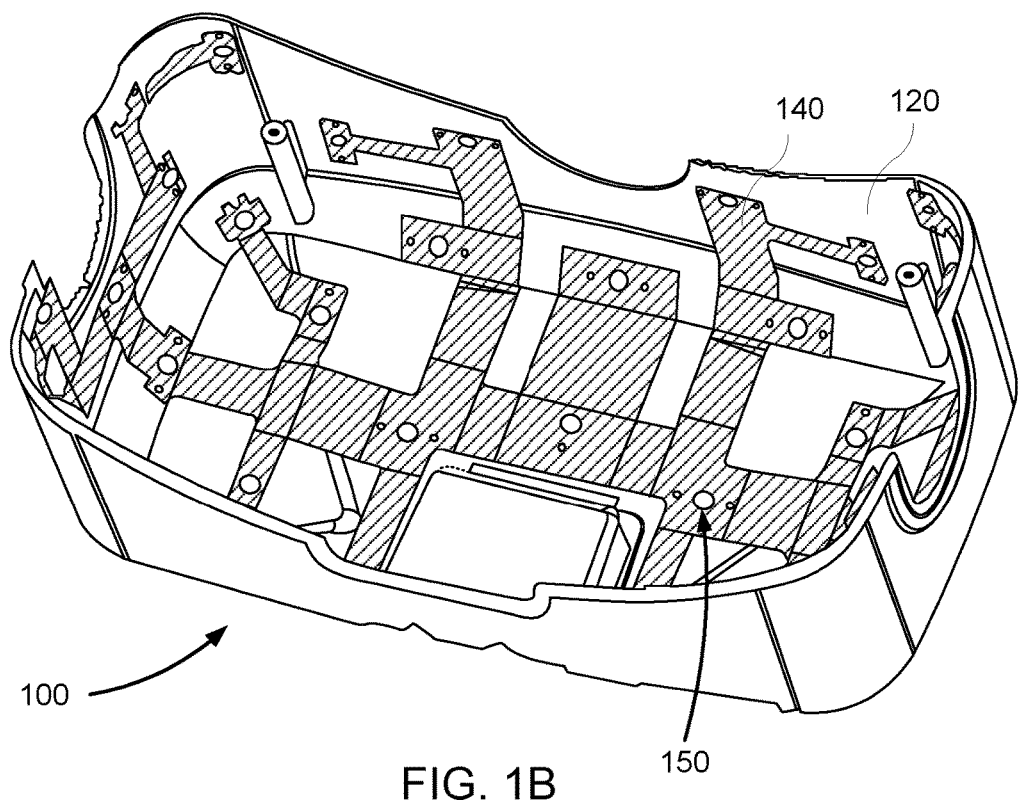
FIG. 1B is an isometric view of an inside of an outer shell of a virtual reality headset, according to one embodiment.

FIG. 1A shows an external view of an embodiment of an outer shell 100 of a virtual reality headset, while FIG. 1B shows the inside of the outer shell 100. The outer shell 100 is shaped so it can comfortably fit over a user's face and enclose necessary electronics. Accordingly, the outer shell 100 has front, top, bottom, left and right surfaces. Components for providing content to a user via the virtual reality headset are included in the outer shell 110. For example, electronic components for providing content are positioned proximate to an interior of the front surface of the outer shell, allowing a user to position the electronic components in a position relative to the user's face to view content presented by the electronic components. The outer shell 100 and any attached components may block various wavelengths of light (e.g., wavelengths corresponding to visible light) to prevent the wavelengths of light from impairing the content presented by the electronic components included in the outer shell 110.

As shown in FIG. 1B, the outer shell 100 comprises a flexible array of light emitting diodes (LEDs) 140 molded into a housing 120. The housing is made of a casting material 180, such as resin; however, in other embodiments, the casting material 180 may be any suitable material. The casting material 180 is transmissible to certain wavelengths of light. For example, the casting material 180 is transmissible to wavelengths of light generated by the LEDs in the flexible array of LEDs. The casting material 180 may also be opaque to certain wavelengths of light. In various embodiments, the casting material 180 is transmissible to wavelengths of light generated by the flexible array of LEDs and opaque to other wavelengths. For example the casting material 180 is transmissible to infrared wavelengths and opaque to wavelengths corresponding to visible light. The housing 120 may have raised and/or recessed features, which may be used to add additional functionality, display a company logo, or increase aesthetic appeal. In various embodiments, the housing 120 may have rubber contact points on the top and bottom surfaces, allowing a user to better grip the virtual reality headset.

In some embodiments, fabric is included on the exteriors of the outer shell 100. The fabric may be partially embedded into the housing 120 or secured to the housing 120 with adhesive. Alternatively, the fabric may be fully or partially overmolded into the housing 120 as further described below. In some embodiments, the fabric may be secured to the housing 120 by molding the casting material 180 through openings in the fabric, creating molded pins. The electromagnetic transmission properties of the fabric may match those of the casting material 180 used for the housing 120. For example, the fabric blocks wavelengths of light corresponding to visible light while transmitting infrared wavelengths of light. Additionally, portions of the housing 120 may be cut out and replaced with fabric to reduce the amount of casting material 180 used, which reduces the weight of the outer shell 100. Alternatively, the housing 120 may be thinner in the areas where including fabric, rather than being cut out. The thinner areas of the housing 120 may have patterns that maintain the structural integrity of the outer shell 100 while reducing its weight and the amount of casting material 180 used.

The flexible array of LEDs 140 embedded in the housing 120 comprises a flexible circuit and one or more LEDs 150. The flexible circuit allows the flexible array of LEDs 140 to be shaped according to the form of the outer shell 100 and allows the LEDs 150 to be connected in a single circuit that may be premade in a specific configuration before the housing 120 is molded. In various embodiments, the LEDs 150 may protrude from the surface of the flexible circuit. The LEDs 150 emit wavelengths of infrared light in some embodiments, and may emit any suitable wavelengths of light in various embodiments. Light emitted from each LED 150 of the flexible array of LEDs 140 may be focused by an encircling clip to aid in calibration of the virtual reality headset by providing a smaller area or light for detection by the calibration system. The encircling clips may block wavelengths of light emitted by the flexible array of LEDs, minimizing light emitted by an LED 150 overlapping with light emitted by another LED 150. For example, encircling clips block wavelengths of infrared light.

The flexible array of LEDs 140 is molded into the housing 120 so a portion of the flexible array of LEDs 140 is embedded in the housing 120 while another portion is not embedded. For example, an upper portion of the flexible array of LEDs is molded into the housing 120, while a lower portion of the flexible array of LEDs 140 is not. Hence, an inner surface of the outer shell 100 includes the housing 120 and the flexible array of LEDs, while an outer surface of the outer shell includes only the housing 120. For the portion of the flexible array of LEDs molded into the housing 120, a specified thickness of the casting material 180 covers the flexible array of LEDs. The specified thickness may be predetermined in various embodiments. The thickness of the layer of casting material 180 covering flexible the array of LEDs 140 may be uniform across the flexible array of LEDs or may vary for different areas of the flexible array of LEDs. In one embodiment, the housing 120 may be flush with the top of the LEDs 150 so the flexible array of LEDs is covered by a small thickness of the casting material 180. Alternatively, the thickness of the casting material 180 covering flexible array of LEDs may be more significant (e.g., several millimeters or more).

Process for Overmolding Outer Shell of Headset

Figure 2:
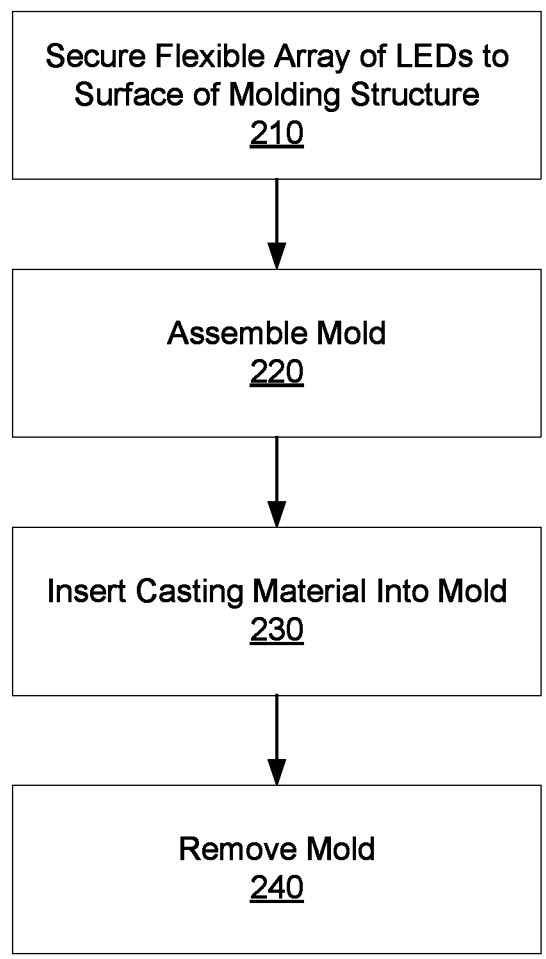
FIG. 2 is a flowchart for an overmolding process, according to one embodiment.

FIG. 2 is an example of a method for including a flexible array of light emitting diodes (LEDs) into a housing. In various embodiments, the method may include different and/or additional steps than those described in conjunction with FIG. 2. Additionally, in some embodiments, steps of the method may be performed in different orders.

Initially, the flexible array of LEDs is secured 210 to a surface of a molding structure. For example, the flexible array of LEDs 140 is secured to a surface 210 of a molding structure by a clip that is also molded into a housing 120, such as an encircling clip. Alternatively, the flexible array of LEDs 140 is secured 210 to a surface of the molding structure through suction (e.g., through creating a vacuum). For example, the surface of the molding structure includes one or more openings, allowing a pressure difference between the surface of the molding structure and another surface of the molding structure parallel to the surface to secure 210 the flexible array of LEDs 140 to the surface of the molding structure (e.g., through creating a vacuum).

After securing 210 the flexible array of LEDs 140 to the surface of the molding structure, the mold is assembled 220 using one or more additional portions. For example, an additional portion of the molding structure is positioned relative to the portion of the molding structure to which the flexible array of LEDs 140 is secured 210. In various embodiments, the additional portion of the molding structure is positioned so there is a specified distance between the flexible array of LEDs 140 and an inner surface of the additional molding structure parallel to the surface of the molding structure to which the flexible LED array is secured 210. Hence, the assembled mold includes a specified distance between the flexible array of LEDs 140 and a surface of an additional molding structure.

A casing material that is transmissible to one or more wavelengths of light emitted by the flexible LED array having is inserted 230 into the assembled mold. The casting material can be inserted 230 via casting, injection and/or thermoforming. The mold is subsequently removed 240 to produce the housing 120 in which the flexible LED array is included. In some embodiments, fabric is secured 210 to the surface of the molding structure with the flexible array of LEDs 140 to include the fabric in the housing 120 along with the flexible array of LEDs 140. Alternatively, the fabric may be molded to the housing 120 separately from the flexible array of LEDs 140. If the fabric is separately molded, the flexible array of LEDs 140 may be overmolded or co-molded into the housing 120 as described above in conjunction with FIG. 2. The fabric may then be secured to a surface of the housing 120, so the surface of the housing 120 acts as the molding structure described above in conjunction with FIG. 2. An alternative molding structure, or the additional molding structure, is then positioned relative to the surface of the housing 120 and a casting material is inserted into an opening separating the surface of the housing 120 to which the fabric is secured from the alternative molding structure. Fabric for inclusion in the housing 120 may include one or more openings, so the casting material travels through the opening when inserted into an assembled mold, causing the casting material to form molded pins to secure the fabric.

Figure 3A:
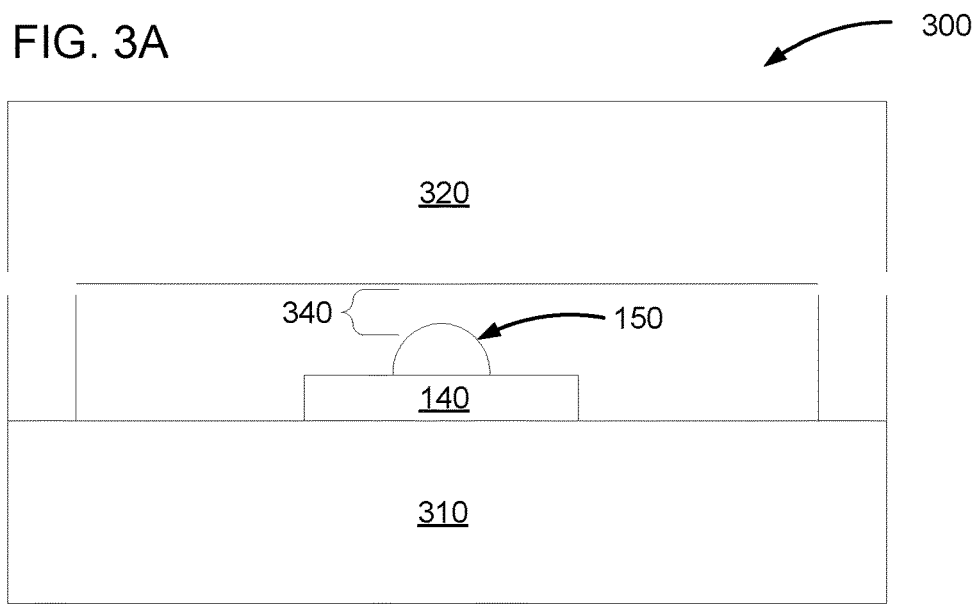
FIG. 3A is an example of attaching a flexible array of light emitting diodes (LEDs) to a mold, according to one embodiment.

FIG. 3A is an example of an assembled mold 300 with a flexible array of light emitting diodes (LEDs) 140 secured to a surface of a portion of a molding structure 310. The mold 300 also includes an additional molding structure 320 having a surface that is separated from the flexible array of LEDs 140 by a specified distance 340. In various embodiments, the distance 340 between the surfaces of the additional molding structure 320 to the flexible array of LEDs 140 is measured between the surface of the additional molding structure 320 and a surface of an LED 150 included in the flexible array of LEDs 140.

Figure 3B:
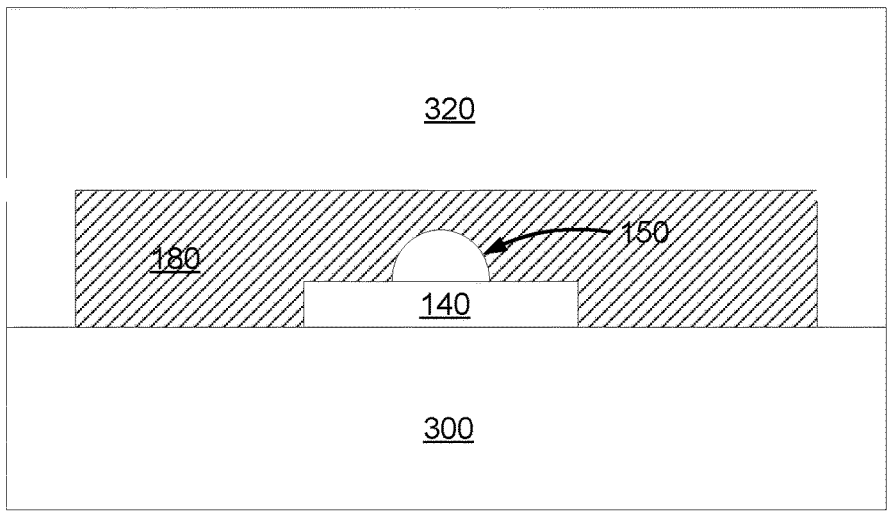
FIG. 3B is an example of casting material pouted into a mold to which a flexible array of light emitting diodes (LEDs) has been attached, according to one embodiment.
Figure 3C:
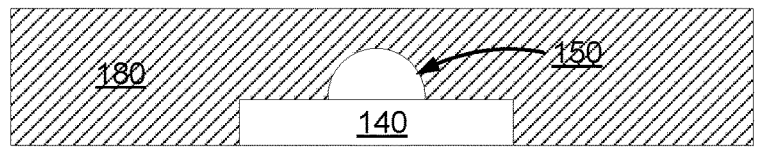
FIG. 3C is a flexible array of light emitting diodes (LED) overmolded into a casting material, according to one embodiment.

A casting material 180, such as resin, is inserted into the mold 300 as shown in FIG. 3B and fills an area between the surface of the portion of the molding structure 310 to which the flexible array of LEDs 140 is secured and a surface of the additional molding structure 320 to produce the housing 180. After the casting material 180 has set or cured, the mold 300 is removed, resulting in the housing 120. FIG. 3C shows the resulting housing 120 after removal of the mold 300 from the casting material 180. As shown in FIG. 3C, the housing 120 includes the flexible array of LEDs 140 with the specified distance 340 between a surface of the flexible array of LEDs 140 and an interior surface of the housing that is parallel to the surface of the flexible array of LEDs 140, which corresponds to the surface of the additional molding structure 320 in FIGS. 3A and 3B

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An outer shell of a headset comprising:
   a housing comprising an exterior surface and an interior surface opposite the exterior surface; and
   a plurality of light emitting diodes (LEDs) molded into the housing such that a portion of a material of the housing exists between the LEDS and the exterior surface, the LEDs configured to emit one or more wavelengths of light through the portion of the material and toward the exterior surface of the headset,
   wherein the material of the housing is transmissible to the one or more wavelengths of light.

2. The outer shell of claim 1, wherein the one or more wavelengths of light are infrared wavelengths.

3. The outer shell of claim 1, wherein the LEDs are connected via a flexible circuit.

4. The outer shell of claim 3, wherein at least a portion of the flexible circuit is not molded into the housing.

5. The outer shell of claim 1, further comprising one or more encircling clips embedded in the housing, each encircling clip positioned around one of the LEDs.

6. The outer shell of claim 5, wherein the encircling clips are opaque to the one or more wavelengths of light.

7. The outer shell of claim 1, wherein the material of the housing is resin.

8. The outer shell of claim 1, wherein the material of the housing is opaque to visible light.

9. The outer shell of claim 1, further comprising:
   one or more portions of fabric secured to the exterior surface of the housing.

10. The outer shell of claim 9, where the fabric is transmissible to the one or more wavelengths of light.

11. The outer shell of claim 9, wherein the fabric is opaque to visible light.

12. The outer shell of claim 9, wherein a portion of each of the one or more portions of fabric is molded into the housing.

13. The outer shell of claim 9, wherein the housing has one or more cutouts, and wherein each of the one or more portions of fabric is secured to the housing such that it covers one of the one or more cutouts.

14. The method of claim 9, wherein at least one of the one or more portions of fabric is secured to the housing via pins of the material formed by molding the material of the housing through holes in the fabric.

15. A virtual reality headset comprising:
   an outer shell comprising:
      a housing comprising an exterior surface and an interior surface opposite the exterior surface; and
      a plurality of light emitting diodes (LEDs) molded into the housing such that a portion of a material of the housing exists between the LEDS and the exterior surface, the LEDs configured to emit one or more wavelengths of light through the portion of the material and toward the exterior surface of the headset,
      wherein the material of the housing is transmissible to the one or more wavelengths of light; and
   one or more electronic components configured to provide content to a user of a virtual reality headset, the one or more electronic components positioned proximate to a front portion of the interior surface of the outer shell.

16. The virtual reality headset of claim 15, wherein the one or more wavelengths of light are infrared wavelengths.

17. The virtual reality headset of claim 15, further comprising one or more encircling clips embedded in the housing, each encircling clip positioned around one of the LEDs.

18. The virtual reality headset of claim 17, wherein the encircling clips are opaque to the one or more wavelengths of light.

19. The virtual reality headset of claim 15, wherein the material of the housing is opaque to visible light.

20. The virtual reality headset of claim 15, further comprising:
   one or more portions of fabric secured to the exterior surface of the housing.

21. The virtual reality headset of claim 20, wherein the fabric is opaque to visible light.

22. A virtual reality system comprising:
   the virtual reality headset of claim 15; and
   a camera configured to capture the one or more wavelengths of light of the plurality of LEDs;
   wherein the virtual reality system is configured to detect a position and an orientation of the virtual reality headset based on the one or more wavelengths of light captured by the camera.

23. The virtual reality system of claim 22, wherein the virtual reality system is further configured to detect the position and the orientation of the virtual reality headset in three dimensions.

* * * * *